United States Patent
Fischer et al.

(10) Patent No.: US 12,467,335 B2
(45) Date of Patent: Nov. 11, 2025

(54) GEOPOLYMER COMPOSITIONS AND METHODS

(71) Applicant: Schlumberger Technology Corporation, Sugar Land, TX (US)

(72) Inventors: Nathan Fischer, Sugar Land, TX (US); Yeukayi Nenjerama, Sugar Land, TX (US); Christopher Parton, Rosenberg, TX (US); Randy Tercero, Laporte, TX (US); Mark Meade, Katy, TX (US); Geoffrey Landry, Richmond, TX (US); Andrey Yakovlev, Houston, TX (US); Anatoly Medvedev, Cambridge (GB); Bipin Jain, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/577,893

(22) PCT Filed: Jul. 8, 2022

(86) PCT No.: PCT/US2022/036536
§ 371 (c)(1),
(2) Date: Jun. 20, 2024

(87) PCT Pub. No.: WO2023/283432
PCT Pub. Date: Jan. 12, 2023

(65) Prior Publication Data
US 2024/0368962 A1 Nov. 7, 2024

Related U.S. Application Data

(60) Provisional application No. 63/219,893, filed on Jul. 9, 2021.

(51) Int. Cl.
*E21B 33/138* (2006.01)
*C04B 14/06* (2006.01)
(Continued)

(52) U.S. Cl.
CPC ............ *E21B 33/138* (2013.01); *C04B 14/06* (2013.01); *C04B 14/10* (2013.01); *C04B 18/06* (2013.01);
(Continued)

(58) Field of Classification Search
CPC ....... E21B 33/138; C04B 14/06; C04B 14/10; C04B 18/06; C04B 20/0036;
(Continued)

(56) References Cited

U.S. PATENT DOCUMENTS

| | | |
|---|---|---|
| 4,509,985 A | 4/1985 | Davidovits |
| 4,859,367 A | 8/1989 | Davidovits |

(Continued)

FOREIGN PATENT DOCUMENTS

| | | |
|---|---|---|
| EP | 0621247 A2 | 10/1994 |
| EP | 1887065 B1 | 11/2010 |

(Continued)

OTHER PUBLICATIONS

International Search Report and Written Opinion issued in International Patent application PCT/us2022/036536 on Oct. 26, 2022, 14 pages.

(Continued)

*Primary Examiner* — Crystal J Lee
(74) *Attorney, Agent, or Firm* — Jeffrey D. Frantz

(57) ABSTRACT

Geopolymeric compositions are presented that are useful for cementing subterranean wells. The compositions may contain an aluminosilicate source, a metal silicate, an alkali activator and a slurry density modifier that may contain uintaite, vitrified shale, petroleum coke or coal or combinations thereof. Methods for placing the geopolymeric compositions in subterranean wells are also presented.

20 Claims, 2 Drawing Sheets

(51) Int. Cl.
*C04B 14/10* (2006.01)
*C04B 18/06* (2006.01)
*C04B 20/00* (2006.01)
*C04B 22/06* (2006.01)
*C04B 28/00* (2006.01)
*C04B 28/14* (2006.01)
*C04B 103/00* (2006.01)
*C04B 111/00* (2006.01)
*C09K 8/473* (2006.01)
*C09K 8/487* (2006.01)

(52) U.S. Cl.
CPC ........ *C04B 20/0036* (2013.01); *C04B 22/062* (2013.01); *C04B 28/006* (2013.01); *C04B 28/14* (2013.01); *C09K 8/473* (2013.01); *C09K 8/487* (2013.01); *C04B 2103/004* (2013.01); *C04B 2111/00146* (2013.01)

(58) Field of Classification Search
CPC ..... C04B 22/062; C04B 28/006; C04B 28/14; C09K 8/473; C09K 8/487
See application file for complete search history.

(56) References Cited

U.S. PATENT DOCUMENTS

| | | | |
|---|---|---|---|
| 5,349,118 | A | 9/1994 | Davidovits |
| 5,356,579 | A | 10/1994 | Jennings |
| 5,539,140 | A | 7/1996 | Davidovits |
| 5,626,665 | A | 5/1997 | Barger |
| 5,635,292 | A | 6/1997 | Jennings |
| 5,637,412 | A | 6/1997 | Jennings |
| 5,788,762 | A | 8/1998 | Barger |
| 7,794,537 | B2 | 9/2010 | Barlet-Gouedard |
| 7,846,250 | B2 | 12/2010 | Barlet-Gouedard |
| 8,535,437 | B2 | 9/2013 | Pershikova |
| 9,206,343 | B2 | 12/2015 | Pershikova |
| 9,222,010 | B2 | 12/2015 | Porcherie |
| 9,394,202 | B2 | 7/2016 | Porcherie |
| 9,840,653 | B2 | 12/2017 | Chatterji et al. |
| 10,876,042 | B2 | 12/2020 | Qu |
| 2008/0028994 | A1* | 2/2008 | Barlet-Gouedard ........................ C04B 28/006 106/790 |
| 2009/0139719 | A1 | 6/2009 | Luo |
| 2011/0073311 | A1 | 3/2011 | Porcherie |
| 2012/0138299 | A1 | 6/2012 | Joseph |
| 2012/0260829 | A1 | 10/2012 | Pershikova |
| 2018/0037506 | A1 | 2/2018 | Zubrod |
| 2020/0231503 | A1* | 7/2020 | Dubey ............... C04B 40/0608 |
| 2021/0087457 | A1* | 3/2021 | Abd Rahman ..... C04B 40/0032 |

FOREIGN PATENT DOCUMENTS

| | | | | |
|---|---|---|---|---|
| WO | 2005019130 | A1 | 3/2005 | |
| WO | 2006061561 | A1 | 6/2006 | |
| WO | 2008017414 | A1 | 2/2008 | |
| WO | WO-2020117185 | A1 * | 6/2020 | .......... C04B 14/106 |
| WO | 2021030372 | A2 | 2/2021 | |
| WO | 2021188155 | A1 | 9/2021 | |

OTHER PUBLICATIONS

Adjei, S et al.: "Geopolymer as the Future of Oil-Well Cement: A Review", Journal of Petroleum Science and Engineering, 208 Part B, 2022, 8 pages.

Davidovits, J., "Synthesis of New High-Temperature Geo-Polymers for Reinforced Plastics/Composites", Proc. PACTEC "79 Society of Plastics Engineers, Costa Mesa, CA, USA (1979), pp. 151-154.

Nasvi, Mohamed M.C et al., "Geopolymer as well cement and the variation of its mechanical behavior with curing temperature", Greenhouse Gases: Science and Technology, 2012, 2(1), pp. 46-58.

Salehi, S et al., "Geopolymer Cements: How Can You Plug and Abandon a Well With New Class of Cheap Efficient Sealing Materials," SPE-185106-MS, 2017, pp.

American Petroleum Institute: "Recommended Practice for Testing Well Cements," publication API RP10B-2, 2nd Edition, Apr. 2013, 124 pages.

"Standard Test Methods for Time of Setting of Hydraulic Cement by Vicat Needle," Astm C191-21, American Society for Testing and Materials (ASTM), 2021, 8 pages.

* cited by examiner

GEOPOLYMER COMPOSITIONS AND METHODS

This application is the U.S. national phase of International Patent Application No. PCT/US2022/036536, filed Jul. 8, 2022, and entitled "GEOPOLYMER COMPOSITIONS AND METHODS" which claims benefit of U.S. Provisional Patent Application Ser. No. 63/219,893 filed Jul. 9, 2021, both of which are entirely incorporated by reference herein.

BACKGROUND

The statements in this section merely provide background information related to the present disclosure and may not constitute prior art.

The present disclosure broadly relates to well cementing. More particularly the invention relates to the use of geopolymers, to geopolymer slurry compositions and the related methods of placing the geopolymer composition in a well using conventional or unconventional cementing techniques.

Geopolymers are a novel class of materials that are formed by chemical dissolution and subsequent recondensation of various aluminosilicate oxides and silicates to form an amorphous three-dimensional framework structure. Therefore, a geopolymer is a three-dimensional aluminosilicate mineral polymer. The term geopolymer was proposed and first used by J. Davidovits (Synthesis of new high-temperature geo-polymers for reinforced plastics/composites, SPE PACTEC' 79, *Society of Plastics Engineers*) in 1976 at the IUPAC International Symposium on Macromolecules held in Stockholm.

Geopolymers based on alumino-silicates are designated as poly (sialate), which is an abbreviation for poly(silicon-oxo-aluminate) or $(-Si-O-Al-O-)_n$ (with $n$ being the degree of polymerization). The sialate network comprises $SiO_4$ and $AlO_4$ tetrahedra linked alternately by sharing all the oxygens, with $Al^{3+}$ and $Si^{4+}$ in IV-fold coordination with oxygen. Positive ions ($Na^+$, $K^+$, $Li^+$, $Ca^{2+}$ . . . ) may be present in the framework cavities to balance the negative charge of $Al^{3+}$ in IV-fold coordination.

The empirical formula of polysialates is: $M_n\{-(SiO_2)_z-AlO_2\}_n$, w $H_2O$, wherein M is a cation such as potassium, sodium or calcium, n is a degree of polymerization and z is the Si/Al atomic ratio that may be 1, 2, 3 or more.

The three-dimensional (3D) geopolymers networks are summarized in Table 1.

The properties and application fields of geopolymers depend principally on their chemical structure, and more particularly on the Si/Al molar ratio. Geopolymers have been investigated for use in several applications, including as concrete systems within the construction industry, as refractory materials and as encapsulants for hazardous and radioactive waste streams. Geopolymers are also recognized as being rapid setting and hardening materials. They exhibit superior hardness and chemical stability.

Geopolymer compositions have been applied in the construction industry. In particular, U.S. Pat. No. 4,509,985 discloses a mineral polymer composition employed for fabricating cast or molded products at room temperature, or temperatures generally up to 120° C. U.S. Pat. Nos. 4,859,367, 5,349,118 and 5,539,140 disclose a geopolymer for solidifying and storing hazardous waste materials in order to provide the waste materials with a high stability over a very long time, comparable to certain archeological materials. U.S. Pat. Nos. 5,356,579, 5,788,762, 5,626,665, 5,635,292 5,637,412 and 5,788,762 disclose cementitious systems with enhanced compressive strengths or low density for construction applications. Patent application WO 2005019130 highlights the problem of controlling the setting time of a geopolymer system in the construction industry.

Geopolymer synthesis involves the suspension of solid raw materials, such as the above mentioned alumino-silicates, into a carrier fluid to form a slurry. The fluid-to-solid ratio of this slurry affects properties of the slurry such as, for example, its viscosity and hardening time, and the properties of the hardened material obtained from the same slurry. Adjusting the viscosity of the geopolymeric precursor slurry without altering the other properties is important in many applications such as forming coatings, molding ceramic pieces, placing concretes in construction applications, and performing well cementing operations.

Well cementing, in particular, involves controlling the viscosity and thickening time of the slurry at various temperatures encountered by the fluid in order to achieve successful placement, while the fluid-to-solids ratio affects other parameters of well cementing operations, including the density of the slurry, and the permeability and the mechanical properties of the hardened material.

In subterranean applications generally, it is often useful to control density and/or density profile (relationship of density to temperature and pressure) of the geopolymer precursor slurry. Because the slurry is placed at a target underground location, which may require vertical and horizontal movement of the slurry to reach the target location, and because temperature and pressure can vary widely in underground environments, control of the slurry density and density profile can help with placement of the slurry prior to setting. In some cases, movement of the slurry is undertaken in multiple stages, so flow starting and stopping needs can influence density and density profile targets. Thus, for subterranean applications, access to a broad range of selectable densities and density profiles for geopolymer precursor slurries can be helpful.

Fluid loss control is another important parameter for geopolymer precursor slurries used in oilfield application. During slurry placement into the wellbore under pressure, the carrier fluid may escape into the formation by a filtration

TABLE 1

Geopolymer chemical designations (wherein M is a cation such as K, Na or Ca, and n is a degree of polymerization).

| Si/Al ratio | Designation | Structure | Abbreviations |
|---|---|---|---|
| 1 | Poly(sialate) | $M_n(-Si-O-Al-O-)_n$ | (M)-PS |
| 2 | Poly(sialate-siloxo) | $M_n(-Si-O-Al-O-Si-O)_n$ | (M)-PSS |
| 3 | Poly(sialate-disiloxo) | $M_n(-Si-O-Al-O-Si-O-Si-O-)_n$ | (M)-PSDS | process. Uncontrolled fluid loss may result in a slurry density increase and a deviation from the original slurry design. If sufficient fluid is lost into the formation, primary cementing failures may occur. This may be mitigated by incorporating fluid loss control agents in the slurries.

As mentioned above, slurry density may be controlled by varying the fluid-to-solids ratio, and control of slurry density and density profile can be useful. However, relying solely on this strategy may limit the density range within which acceptable performance may be obtained. Therefore, there is a need for alternate methods for adjusting slurry density without unduly modifying the fluid-to-solids ratio.

SUMMARY

The present disclosure provides well cementing compositions that comprise geopolymers and methods for employing them in well cementing operations.

In an aspect, embodiments relate to methods that comprise preparing a pumpable geopolymeric composition comprising an aluminosilicate source, a metal silicate, an alkali or alkaline earth activator, a carrier fluid and a slurry density modifier comprising unitatite, vitrified shale, petroleum coke or coal or combinations thereof. The composition is then placed in a subterranean well.

In a further aspect, embodiments relate to methods that comprise preparing a pumpable geopolymeric composition comprising an aluminosilicate source, a metal silicate, an alkali or alkaline earth activator, a carrier fluid and a slurry density modifier comprising unitatite, vitrified shale, petroleum coke or coal or combinations thereof. The composition is then placed in a subterranean well, allowed to set and harden and establish zonal isolation in the subterranean well.

DETAILED DESCRIPTION

Figure 1:
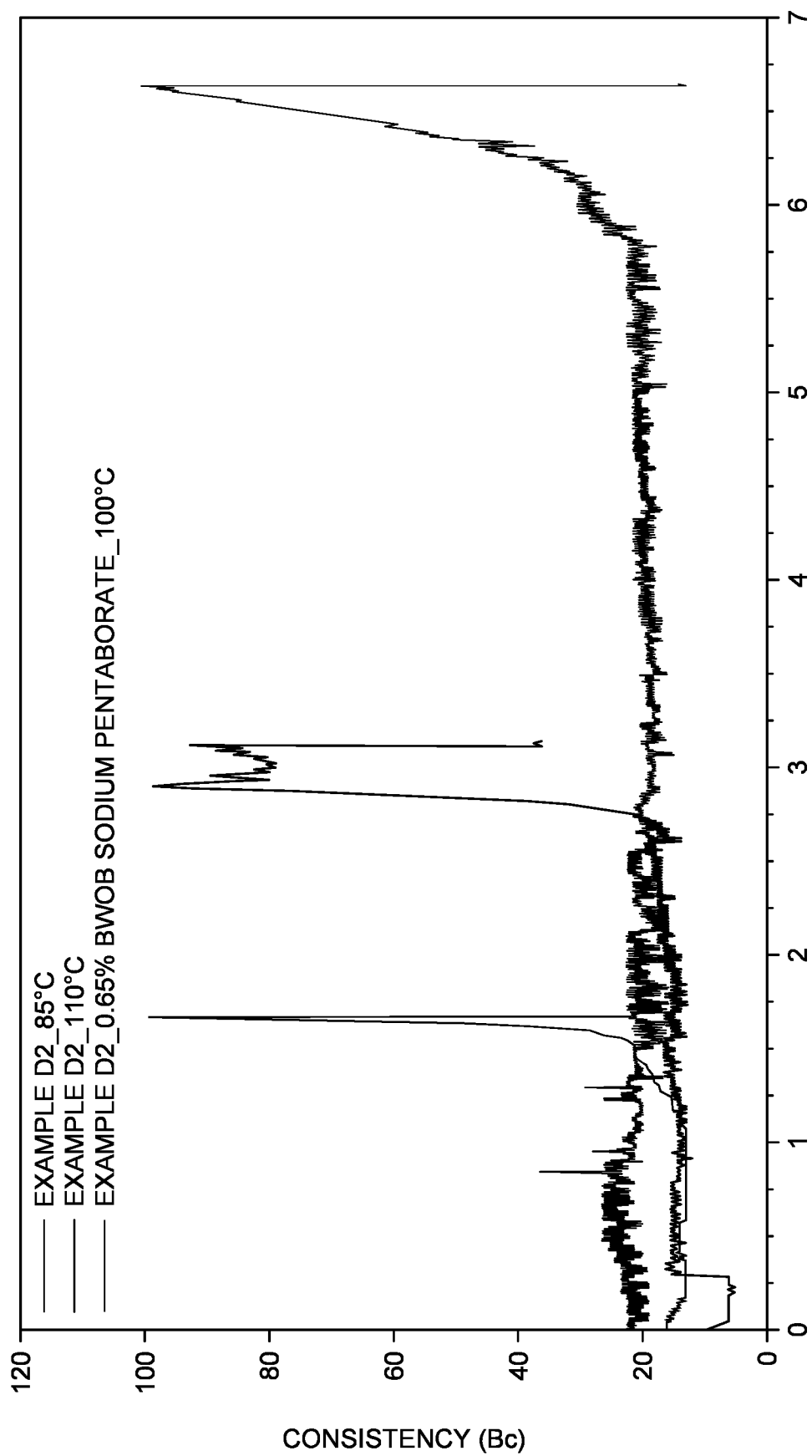
FIG. 1 presents the impact of temperature on the thickening time of geopolymer formulations.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

As used herein, "embodiments" refers to non-limiting examples disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

According to the disclosure, the geopolymer formulations involve the use of an aluminosilicate source, a metal silicate and an alkali activator in a carrier fluid at near-ambient temperature. The carrier fluid may be aqueous or non-aqueous. As it has been said previously, all the four components do not need necessarily to be added separately; for example, the alkali activator can already be within water. So, the aluminosilicate source can be in the form of a solid component; the metal silicate can be in the form of a solid or of an aqueous solution of metal silicate; the alkali activator can be in the form of a solid or of an aqueous solution of alkali activator.

Formation of the set geopolymer involves an aluminosilicate source, which is also called aluminosilicate binder. Examples of aluminosilicate sources from which geopolymers may be formed include (but are not limited to) ASTM type C fly ash, ASTM type F fly ash, fly ash not classified by ASTM, volcanic ash, ground blast furnace slag, calcined clays, which may be partially or fully calcined clays (metakaolin is a partially calcined clay), aluminum-containing silica fume, natural aluminosilicate, synthetic aluminosilicate glass powder, zeolite, scoria, allophone, bentonite, red mud, which may be calcined, and pumice. These materials contain a significant proportion of an amorphous aluminosilicate phase, which reacts in strong alkaline solutions. The more common aluminosilicates are fly ash, metakaolin and blast furnace slag. Mixtures of two or more aluminosilicate sources may also be used if desired. In addition, alumina and silica may be added separately, for example as a blend of bauxite and silica fume. In another embodiment, the aluminosilicate component comprises a first aluminosilicate binder and optionally one or more secondary binder components which may include ground granulated blast furnace slag, portland cement, kaolin, metakaolin or silica fume.

Formation of the set geopolymer also involves an alkali activator. The alkali activator may be an alkali metal, an alkaline-earth metal hydroxide, or combinations thereof. Alkali metal hydroxides may be sodium, lithium, or potassium hydroxide. Alkaline-earth metal hydroxides may include calcium, barium, or magnesium hydroxide. Mixtures of alkali metal hydroxides, alkaline earth metal hydroxides, and mixtures of both alkali metal and alkaline earth metal hydroxides can be used. The metal hydroxide may be in the form of a solid or an aqueous mixture Also, the activator in another embodiment can be encapsulated. The activator when in solid and/or liquid state can be trapped in a capsule that will break when subjected to, for example, mechanical stress on the capsule, or coating degradation owing to temperature, chemical exposure or radiation exposure. Also, the activator when in solid and/or liquid state can be trapped in a capsule that will naturally degrade if made from a biodegradable or self-destructive material. Furthermore, the alkali activator when in liquid state may be adsorbed into a porous material and may be released after a certain time or due to a predefined event. The alkali activator may be present in the composition at a concentration between about 0.1 moles/L (M) to 10M or between 3M and 6M.

Formation of a geopolymer also involves a metal silicate. The metal silicate may be an alkali metal silicate such as sodium silicate, sodium metasilicate or potassium silicate. The sodium metasilicate may be present at a concentration between 0.01 kg/L and 0.2 kg/L, or between 0.05 kg/L and 0.1 kg/L. The $SiO_2/Na_2O$ molar ratio may be less than or equal to 3.2. The $SiO_2/K_2O$ molar ratio may be less than or equal to or less than 3.2. The alkali silicate may be present in the composition at a concentration between about 0.05M and 5M, or between 1M and 4M. The metal silicates may be dry blended with the aluminosilicate source. Also, the metal silicate in another embodiment may be encapsulated.

The methods presented in this disclosure are applicable to the oilfield, for example during completion of the wellbore of oil or gas wells. To be used in oilfield applications, a pumpable slurry is formed where the geopolymer blend is mixed with a carrier fluid. A slurry that is a geopolymer precursor is generally considered pumpable where the slurry has a consistency lower than about 70 Bc (Bearden consistency units) as measured by a high-temperature, high-pressure consistometer, a yield value (Ty) lower than about 50 $lbf/100\ ft^2$, or both. Various additives may be added to the slurry, and the slurry may then be pumped into the wellbore. The slurry is then allowed to set and harden in the well to provide zonal isolation in the wellbore.

A typical property of geopolymer systems is their ability to set without delay after mixing. However, for oilfield applications, mixability, pumpability, and thickening time control are useful to manage placement of the geopolymer slurry at a target location prior to setting. For this reason, methods for retarding the thickening of the geopolymer slurry or ways to control thickening times of the geopolymer are desired.

Several retarders may delay the setting and hardening of geopolymer systems. Table 2 present the results of thickening time tests performed according to the American Petroleum Institute Recommended Practice for Testing Well Cements (API RP 10B). Tests were performed in a high-temperature/high-pressure (HPHT) consistometer to simulate the placement of geopolymer precursor slurries, at a defined Bottom Hole Circulating Temperature (BHCT). A temperature heat-up schedule is followed in order to mimic placement in an actual well. For the tests performed at 57° C., the temperature is reached in 41 minutes and the final pressure is 33.8 MPa (4900 psi). For the tests performed at 85° C., the temperature is reached in 58 minutes and the final pressure is 55.1 MPa (8000 psi). For the tests performed at 110° C., the temperature is reached in 74 minutes and the final pressure is 75.9 MPa (11000 psi)

TABLE 2

Examples of API RP 10B thickening times measured with a HPHT consistometer (hr:min).

| | | % BWOB (by weight of blend): | Temperature (° C.) | | | | |
|---|---|---|---|---|---|---|---|
| | | | 57 | 85 | | | 110 |
| | | | Sample | | | | |
| | | | A2 | A2 | B2 | C2 | D2 |
| | | | Thickening time | | | | |
| Retarder | None | 0 | 6:25 | 0:53 | 0:37 | 5:45 | 1:40 |
| | $Na_2B_{10}O_{16}$, $10H_2O$ | 0.65 | | | | 6:30 | 3:00 |
| | | 1.3 | 23:52 | 6:08 | | | |
| | | 1.6 | | 7:30 | | | |
| | | 1.8 | | 10:39 | 9:51 | | |
| | | 2 | | 13:05 | | | |
| | | 2.6 | | 28:23 | | | |
| | $H_3BO_3$ | 1.9 | | 20:53 | | | |
| | Phosphonate/sodium pentaborate | 1.2 | | | 7:00 | | |
| | Phosphonate/phosphate salt | 6.4 | >15:00 | | | | |
| | Lignosulfonate | 1.51 | | 3:12 | | | |

Sample A2 was made by dissolving the retarder in 358 g of water, adding a blend containing 314 g of metakaolin, 227 g of sodium disilicate and 17.2 g of NaOH to the water, then preparing a slurry in a Waring blender according to API RP 10B. The slurry was then poured into a consistometer cell for measurement of the thickening time.

Sample B2 was made in a manner similar to Sample A2, by dissolving the retarder in 265 g of water, adding a blend comprising 232 g of metakaolin, 168 g of sodium disilicate, 414 g of silica particles as filler and 13 g of NaOH and then forming a slurry for thickening time testing.

Sample C2 was made in a manner similar to Sample A2, by dissolving the retarder in 422 g of sodium hydroxide solution, then adding a blend containing 440 g of type F fly ash and 88 g of sodium disilicate to form a slurry for thickening time testing.

Sample D2 was made in a manner similar to Sample A2, by dissolving the retarder in 374 mL of water, adding a blend comprising 411 g of type F fly ash, 82 g of sodium disilicate and 75 g of NaOH to form a slurry for thickening time testing.

Thus, the setting of geopolymeric formulations can be controlled at different BHCT by boron containing compounds such as sodium pentaborate decahydrate, boric acid, or borax, or lignosulphonates, or phosphorus containing compounds such as phosphoric acid, or mixtures thereof. Retardation of geopolymeric formulations will be sensitive to boron valence for boron containing compounds or phosphate valence for phosphorus containing compounds and/or to retarder concentration.

Table 3 presents the results of tests performed with a Vicat apparatus to measure when setting of a material begins (IST) and ends (FST). The tests were performed in accordance with method ASTM C191 (Standard Test Methods for Time of Setting of Hydraulic Cement by Vicat Needle). The effects of two boron-based retarders were evaluated. The Vicat apparatus is often used to perform screening tests at ambient temperature and pressure.

TABLE 3

Examples of initial setting times (hr:min) obtained with different retarders with Vicat apparatus at ambient temperature and atmospheric pressure.

| Sample | A3 | B3 |
|---|---|---|
| No additive | 1:45 | 12:00 |
| $Na_2B_{10}O_{16}$ 10$H_2O$ | | |
| 2.6% BWOB | 3:00 | — |
| 5.2% BWOB | 4:10 | >500:00 |
| Borax | | |
| 4.2% BWOB | 3:20 | — |

Sample A3 was made by dissolving the retarder in 139 g of sodium hydroxide solution, and adding a blend containing 105 g of metakaolin, 48 g of sodium metasilicate and 17 g of silica particles as filler. The slurries were prepared according to API RP 10B as described above, and poured into a Vicat cell for measurements.

Sample B3 was made in a manner similar to Sample A3 by dissolving the retarder in 358 g of water, and adding a blend containing 314 g of metakaolin, 227 g of sodium disilicate and 17.2 g of sodium hydroxide. The resulting slurry was poured into a Vicat cell for measurements.

The results showed that two boron-based retarders (sodium pentaborate decahydrate and borax) were able to strongly retard different types of geopolymer suspensions at 25° C.

FIG. 1 illustrates the impact of temperature on the thickening time for a geopolymer composition made by adding a blend comprising 411 g of type F fly ash and 82 g of sodium disilicate in 374 mL of water (retarder being predissolved in this water) and by adding 36.5 g of NaOH. This way, retarders are efficient even at high temperature to control geopolymer thickening times.

Control of the thickening time can also be realized by other means. As an example, the nature of the alkali activator and its pH have an impact on the thickening time. Table 4 illustrates the influence of the alkali activator on the thickening time of geopolymeric slurries. It demonstrates the ability to select the alkali activator source according to the downhole conditions.

TABLE 4

Examples of thickening times measured with a HPHT consistometer (hr:min) with different alkali activators measured at 85° C.

| Sample | A4 | B4 |
|---|---|---|
| 100 Bc | 0:53 | >31:00 |

Sample A4 was made by adding a blend containing 314 g of metakaolin, 227 g of sodium disilicate and 17.2 g of NaOH in 358 g of water under mixing, adding 17.2 g of sodium hydroxide. Sample A4 was then tested by measuring the thickening time with a HPHT consistometer.

Sample B4 was made by adding a blend comprising 314 g of metakaolin, 227 g of sodium disilicate and 23.4 g of $NaHCO_3$ to 357 g of water. Sample B4 is then tested by measuring the thickening time with a HPHT consistometer.

Furthermore, depending on properties of the geopolymer, it may be desirable to accelerate thickening of the precursor slurry. Table 5 illustrates the accelerating effect of lithium compounds on the thickening time of geopolymeric slurries at 85° C. The data demonstrate the ability of lithium salts to control the thickening time of geopolymer slurries.

TABLE 5

Examples of thickening times measured with a HPHT consistometer (hr:min) obtained with type F fly ashes and accelerators.

| Sample | A5 | B5 |
|---|---|---|
| No additive | 22:57 | 5:21 |
| LiCl | | |
| 3.5% BWOB | 9:07 | — |
| 7% BWOB | 4:07 | |
| LiOH, $H_2O$ | | |
| 2% BWOB | — | 3:19 |

Sample A5 was made by adding a blend containing 480 g of superfine type F fly ash and 96 g of sodium disilicate to 406 g of a sodium hydroxide solution. Sample A5 was then tested by measuring the thickening time with a HPHT consistometer.

Sample B5 was made by adding a blend containing 442 g of standard type F fly ash and 88 g of sodium disilicate to 423 g of a sodium hydroxide solution. Sample B5 was then tested by measuring the thickening time with a HPHT consistometer.

Figure 2:
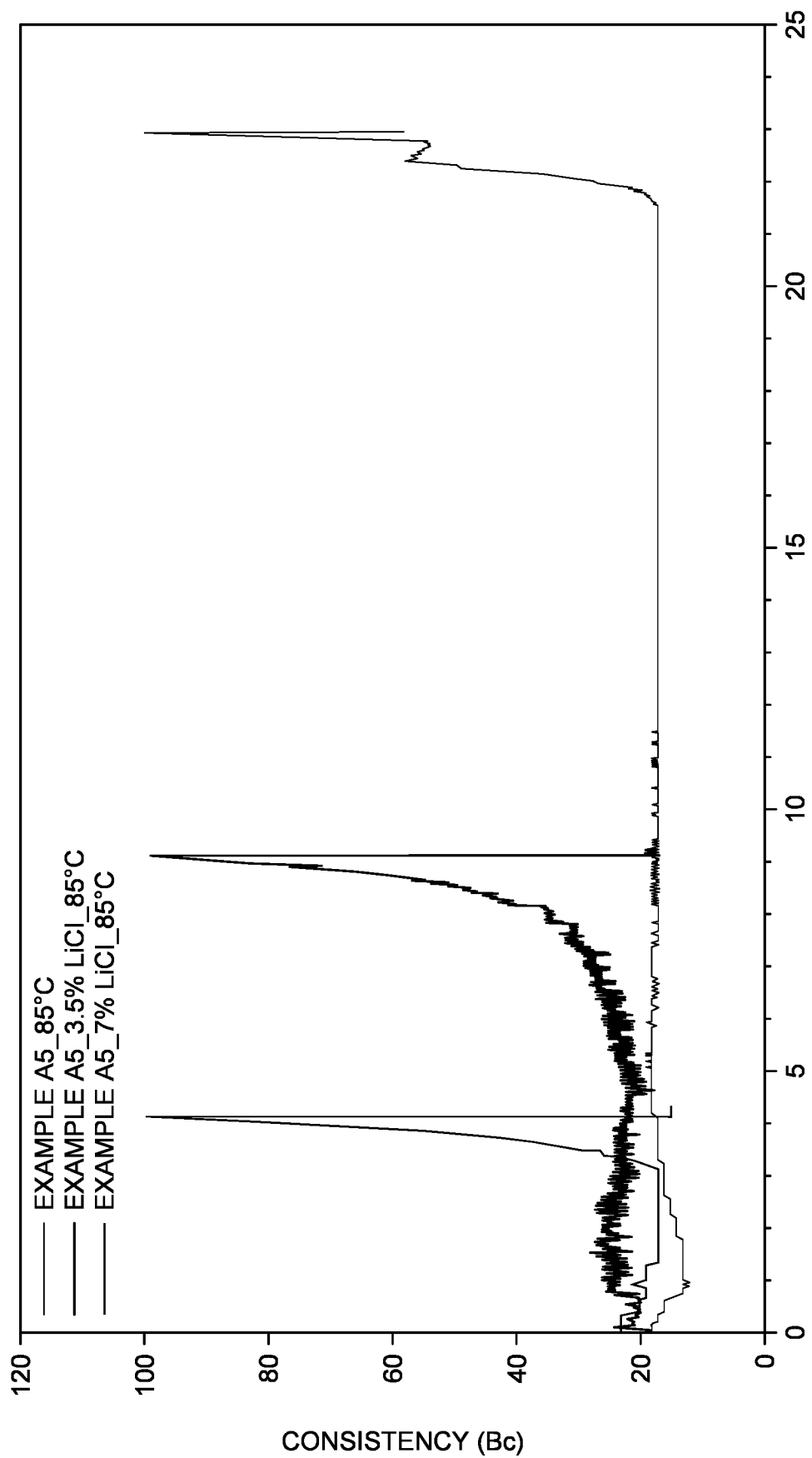
FIG. 2 presents the impact of accelerator addition on the thickening time of geopolymer formulations.

FIG. 2 illustrates the accelerating effect of LiCl on a geopolymer composition containing 480 g of superfine type F fly ash and 96 g of sodium disilicate in 406 g of a sodium hydroxide solution. The thickening times were measured at 85° C. Mixtures of lithium salts can also be used as accelerants. Lithium salts can be added to the geopolymer precursor mixture in amounts up to about 0.5 parts per hundred weight of the total precursor mixture.

Depending on the properties of the geopolymer and the well conditions, the data presented herein reveal that the thickening time can be adjusted by selecting one or more of several accelerators or retarders, varying their concentrations, and changing the nature of the alkali activator and the aluminosilicate.

Further, when use in oilfield applications is sought, the geopolymer slurry must be pumpable. Table 6 illustrates the rheological properties of geopolymer slurries measured at a BHCT of 60° C. The rheological values presented in the table are the plastic viscosity (PV) given in cP and the yield value (Ty) given in Pa, and demonstrate the pumpability and the stability of geopolymeric slurries for application in the oilfield industry. The free fluid values are also presented. All measurements were performed in accordance with API RP 10B.

TABLE 6

Rheological and stability measurements of geopolymer slurries.

| Sample | A6 | B6 | C6 |
|---|---|---|---|
| PV/Ty after mixing | 49/10 | 62/4 | 105/7 |
| PV/TY at BHCT | 48/7 | 53/2 | 85/7 |
| Free Fluid (mL) | 0 | 0 | 0 |

Sample A6 was made by adding a blend containing 411 g of type F fly ash, 82 g of sodium disilicate and 75 g of NaOH to 374 mL of water. Sample A6 was then tested by measuring the rheological properties of the suspension after mixing and after conditioning at 60° C. according to the API RP 10B standard procedure.

Sample B6 was made by dissolving 0.65% BWOB of sodium pentaborate decahydrate in 422 g of sodium hydroxide solution, and adding a blend containing 440 g of type F fly ash and 88 g of sodium disilicate to the solution. Sample B6 was then tested in the same manner as Sample A6.

Sample C6 was made by adding a blend containing 480 g of type F fly ash and 96 g of sodium disilicate to 406 g of the sodium hydroxide solution. Sample C6 was then tested in the same manner as Sample A6

Table 7 shows the difference of setting time according to the conditions of setting. The geopolymer formulation will set more rapidly under static than dynamic conditions. Also normally, the geopolymer slurry may set rapidly after placement.

TABLE 7

Example comparing dynamic and static setting times (hr:min) at 85° C.

| Sample | A7 | B7 |
|---|---|---|
| Additive | None | 2% BWOB LiOH·$(H_2O)_n$ |
| TT Test Pressure of 8000 psi/dynamic | 5:45 | 3:19 |
| Vicat test (samples oven cured) Atmospheric pressure/static | 2:30 | 1:50 |

Sample A7 was made by adding a blend comprising 440 g of type F fly ash and 88 g of sodium disilicate to 422 g of sodium hydroxide solution. Sample B7 was made by adding a blend containing 442 g of type F fly ash and 88 g of sodium disilicate to 424 g of a sodium hydroxide solution containing 2% BWOB LiOH·$(H_2O)_n$. Both samples were mixed according to the API RP 10B procedure and tested in a HPHT consistometer or a Vicat cell.

Also, when use in oilfield applications is sought, the geopolymer systems should have adjustable slurry densities. Generally, the slurry density of the geopolymer precursors described herein ranges from 0.89 g/cm$^3$ (7 lbm/gal) to 2.87 g/cm$^3$ (24 lbm/gal). As presented in Table 8, geopolymer formulations can encompass a density range between 1.45 g/cm$^3$ [12.1 lbm/gal] to 1.84 g/cm$^3$ [15.4 lbm/gal] either by adjusting the water content, by adding fillers, and/or by adding density modifiers.

TABLE 8

Examples of slurry densities obtained with some geopolymeric formulations.

| Sample | A8 | B8 |
|---|---|---|
| Slurry density g/cm$^3$ (lbm/gal) | 1.84 (15.4) | 1.44 (12.06) |

Sample A8 was made by adding a blend containing 232 g of metakaolin, 168 g of sodium disilicate and 414 g of silica particles to 265 g of water. Sample B8 was made by adding a blend of 105 g of metakaolin, 48 g of sodium metasilicate and 17 g of silica particles to 139 g of water. To further broaden the slurry density range, density modifiers may be included in the geopolymeric compositions. Low-density particles may be added to achieve lower slurry densities, or heavy particles may be added to achieve higher slurry densities. The lightweight particles may have densities lower than 2 g/cm$^3$, or lower than 1.3 g/cm$^3$. Examples include hollow glass or ceramic microspheres (cenospheres), plastic particles such as polypropylene beads, uintaite (sold as GILSONITE™), vitrified shale, petroleum coke or coal or combinations thereof. The lightweight particles may be present in the compositions at concentrations between about 0.01 kg/L and 1.0 kg/L (20 lb/bbl and 200 lb/bbl). The particle size range of the low-density particles may be between about 0.3 μm and 3350 μm (6 mesh and 400 mesh). The heavy particles typically may have densities exceeding 2 g/cm$^3$, or more than 3 g/cm$^3$. Examples include hematite, barite, ilmenite, silica and also manganese tetroxide commercially available under the trade names of MicroMax™ and MicroMax FF™. Mixtures of density modifiers can be used to target a particular slurry density or density profile.

It may also be practical to foam the geopolymer composition. The gas utilized to foam the composition may be air or nitrogen. The amount of gas present in the cement composition may be an amount sufficient to form a foam having a density in the range of from about 1 g/cm$^3$ to 1.7 g/cm$^3$ (9 to 14 lbm/gal).

In a further embodiment, other additives can be used with geopolymers according to the present disclosure. Such additives may comprise activators, antifoam agents, defoamers, silica, fluid-loss control additives, viscosifiers, dispersants, expanding agents, anti-settling additives or combinations thereof. Selection of the type and amount of additive largely depends on the nature and composition of the geopolymer or geopolymer precursor slurry, and those of ordinary skill in the art will understand how to select a suitable type and amount of additive for compositions herein.

The fluid-loss control agent may comprise a latex. The latex may be an alkali-swellable latex. The latex may be present in the geopolymer precursor compositions at a concentration between 0.02 L/L and 0.3 L/L (1 gal/bbl and 10 gal/bbl), or between 0.05 L/L and 0.15 L/L.

Viscosifiers may comprise diutan gum having a molecular weight higher than about 1×10$^6$. The diutan gum may be present at a concentration between 0.14 g/L and 1.4 g/L (0.05 lbm/bbl and 0.5 lbm/bbl). Other viscosifiers may comprise polysaccharide biopolymers including a polyanionic cellulose (PAC), welan gum, and/or carboxymethylcellulose (CMC), present at a concentration between 0.14 g/L and 1.4 g/L (0.05 lbm/bbl and 0.5 lbm/bbl). The molecular weight of the polysaccharide biopolymers may be between 100,000 and 1,000,000. Mixtures of any of these viscosifiers can also be used.

Carboxylic acids including glucoheptonic acid, tartaric acid, citric acid, glycolic acid, lactic acid, formic acid, acetic acid, proprionic acid, oxalic acid, malonic acid, succinic acid, adipic acid, malic acid, nicotinic acid, benzoic acid and ethylenediamine tetraacetic acid (EDTA) may be included in the geopolymer precursor compositions as retarders or dispersants or both. Phosphoric acids may be present for the same purpose. Soluble carboxylate salts of these acids may also be employed. These materials may be present in the compositions at concentrations between 0.2 g/L and 20 g/L, such as between 0.5 g/L and 10 g/L, for example between 1 g/L and 5 g/L. Mixtures of these acids, salts, and acids with salts, can be used and can also be mixed with other retarders and dispersants described herein. Low molecular weight saccharides, such as glucose and sucrose, can also be used as retarders.

Expanding agents may comprise calcium sulfate hemihydrate, metal oxides such as MgO or combinations thereof. The expanding agents may be present in the geopolymer precursor compositions at concentrations between 0.01 kg/L and 0.2 kg/L of slurry, or between 0.05 and 0.1 kg/L.

In another embodiment, when various components are used with or within the geopolymer precursor formulation, the particle sizes of the components may be selected and the respective proportions of particle fractions may be optimized in order to have a high Packing Volume Fraction (PVF) solids, and a mixable and pumpable slurry with a minimum amount of water. As a result the Solid Volume Fraction (SVF) of the resulting slurry may be 35-75%, or 50-60%. The following examples do not constitute a limit of the invention but rather indicate to those skilled in the art possible combinations of the particle size of the various components of the geopolymer compositions of the disclosure to make a stable and pumpable suspension.

The geopolymeric composition may be a "trimodal" combination of particles: "large" (e.g., sand or crushed wastes with an average dimension between 100 and 1000 μm), "medium" (e.g., glass beads or fillers with an average dimension between 10 and 100 μm), and "fines" (e.g., micromaterials such as micro fly ashes or micro slags with an average dimension between 0.2 and 10 μm). The geopolymeric composition may also be a "tetramodal" combination of particles: "large" (average dimension between about 200 and 350 μm), "medium" (average dimension between about 10 and 20 μm), "fine" (average dimension of about 1 μm), and "very fine" (average dimension between about 0.1 and 0.15 μm). The geopolymeric composition may also comprise "very large" particles (e.g., glassmaker sand or crushed wastes with an average dimension larger than 1 mm). The 'very fine" category may further comprise latexes, pigments or polymer microgels whose particle sizes may be between about 0.05 and 0.5 μm. An "ultra fine" category may comprise colloidal silica or alumina with average particle sizes between about 7 and 50 nm. The precursor slurries of such geopolymeric compositions can include these particle size distributions.

The mechanical properties of set geopolymer compositions were studied after curing them for several days under high pressure and temperature in high pressure and high temperature chambers to simulate the conditions encountered in a subterranean well. Such measurements are governed by methods specified in API RP 10B.

Tables 9 and 10 illustrate that geopolymer formulations described herein exhibit acceptable compressive strengths with low Young's moduli with or without retarder.

TABLE 9

Mechanical properties measured after 7 days at 90° C. - 20.7 MPa (3000 psi)

| Sample | A9 | A9 | B9 | B9 |
|---|---|---|---|---|
| Sodium pentaborate % BWOB | 0 | 1.8 | 0 | 1.8 |
| Unconfined Compressive Strength (UCS) MPa | 19 | 14 | 15 | 13 |
| Young's modulus MPa | 2400 | 2100 | 2300 | 3000 |

Sample A9 was made by adding a blend containing 314 g of metakaolin and 227 g of sodium disilicate to 358 g of water containing 17.2 g of NaOH. Sample B9 was made by adding a blend containing 232 g of metakaolin, 168 g of sodium disilicate and 414 of silica particles to 265 g of water. Sodium pentaborate retarder was also added to the water in certain samples. The slurries were poured into molds and placed in a HPHT curing chamber for 7 days at 90° C. and 20.7 MPa pressure. Unconfined compressive strength and Young's modulus measurements were then conducted.

TABLE 10

Mechanical properties measured after 21 days at 90° C. - 20.7 MPa (3000 psi)

| Sample | A10 | B10 | C10 |
|---|---|---|---|
| Lithium chloride % BWOB | 0 | 3 | 7 |
| Unconfined Compressive Strength (UCS) MPa | 9.5 | 9.5 | 9 |
| Young's modulus MPa | 1750 | 2550 | 2950 |

Sample A10 was made by adding the blend containing 482 g of standard type F fly ash and 96 g of sodium disilicate to 408 g of the sodium hydroxide solution. Sample B10 was made by adding a blend containing 442 g of standard type F fly ash and 88 g of sodium disilicate to 424 g of the sodium hydroxide solution. The composition also contained 3% BWOB LiCl accelerator. Sample C10 was made by adding a blend containing 480 g of superfine type F fly ash and 96 g of sodium disilicate to 424 g of sodium hydroxide solution. The composition also contained 7% BWOB LiCl. The slurries were poured into molds and placed in a HPHT curing chamber for 7 days at 90° C. and 20.7 MPa pressure. Unconfined compressive strength and Young's modulus measurements were then conducted.

The mechanical properties results revealed that the geopolymer compositions developed adequate strength and flexibility for use in subterranean wells.

Water permeabilities were measured for some prepared geopolymer compositions. The isolation properties of set geopolymers were studied using systems which had passed several days under high pressure and temperature in high pressure and high temperature chambers to simulate the conditions encountered in an oil well.

Table 11 illustrates that geopolymer formulations proposed by this invention exhibit acceptable permeability for oilfield applications.

TABLE 11

Water permability measured after curing
at 90° C. - 20.7 MPa (3000 psi)

| Sample | A11 | B11 | C11 | D11 |
|---|---|---|---|---|
| Water permeability [mD] | 0.08 | <0.008 | <0.006 | <0.006 |

Sample A11 was made by adding a blend containing 232 g of metakaolin, 168 g of sodium disilicate and 414 g of silica particles to a solution 265 g water and 13 g NaOH. Sample B11 was made by adding a blend of 482 g standard type F fly ash and 96 g of sodium disilicate to 408 g of NaOH solution. Sample C11 was made by adding a blend of 442 g standard type F fly ash and 96 g sodium disilicate to 408 g of NaOH solution. Sample D11 was made by adding a blend of 480 g superfine type F fly ash and 96 g sodium disilicate to 406 g NaOH solution which further contained 7% BWOB LiCl accelerator. The slurries were poured into molds and placed in a HPHT curing chamber for 7 days at 90° C. and 20.7 MPa pressure. Following curing cylindrical cores were drilled and water permeabilities were measured using a water permeameter according to the method described in API RP10B.

The methods of the present disclosure are useful in completing subterranean wells, including oil and/or gas wells, water wells, geothermal wells, acid gas wells, and carbon dioxide injection or production wells. Placement of the geopolymer composition in the portion of the wellbore to be completed is accomplished by means that are well known in the art of well cementing. The geopolymer slurry is typically placed in an annular region surrounding a casing to prevent vertical communication through the annulus between the casing and the wellbore or the casing and a larger casing. The geopolymer slurry may be placed in a wellbore by circulation of the slurry down the inside of the casing, followed by a wiper plug and a nonsetting displacement fluid. The wiper plug is usually displaced to a collar, located near the bottom of the casing. The collar catches the wiper plug to prevent overdisplacement of the geopolymer slurry and also minimizes the amount of the geopolymer slurry left in the casing. The geopolymer slurry is circulated up the annulus surrounding the casing, where it is allowed to harden. The annulus could be between the casing and a larger casing or could be between the casing and the borehole wall. As in regular well cementing operations, such cementing operations with a geopolymer slurry may cover only a portion of the open hole, or more typically up to a point inside the next larger casing or sometimes up to the surface. This method has been described for completion between formation and a casing, but can be used in any type of completion, for example with a liner, a slotted liner, a perforated tubular, an expandable tubular, a permeable tube and/or tube or tubing.

In the same way, the methods of the present invention are useful in completing subterranean wells by reverse circulation cementing.

The geopolymer composition can also be used in remedial cementing applications including squeeze cementing and plug cementing, including plug and abandonment operations. During squeeze cementing the geopolymer composition may be forced through perforations or openings in the casing, whether these perforations or openings are made intentionally or not, to the formation and wellbore surrounding the casing to be repaired. Geopolymer precursor is placed in this manner to repair and seal poorly isolated wells, for example, when either the original cement or geopolymer fails, or was not initially placed acceptably, or to shut off a producing interval. For plug cementing, the geopolymer composition is placed inside the well by means that are well known in the art.

According to other embodiments of the invention, the methods of completion described above can be used in combination with conventional cement completion.

EXAMPLES

The following examples are presented to provide a general illustration of the present disclosure, and are not intended to limit the scope of the disclosure in any way. The examples show geopolymeric slurry formulations and their performance during customary laboratory tests that are used to determine suitability for use in an actual well. The tests described below were performed in accordance with procedures published in the following publication: American Petroleum Institute: "Recommended Practice for Testing Well Cements," publication API RP 10B-2, $2^{nd}$ Edition (April 2013). The volume of slurries, prepared in a Waring blender, was 600 mL.

The tables below contain several abbreviations. % BWOFA is % by weight of fly ash. % BVOBS is % by volume of blend-solids. % BWOBS is % by weight of blend-solids. % BWOBF is % by weight of blend-fluid.

Example 1

A 1310-kg/m$^3$ (11.0-lbm/gal) slurry was prepared with the composition shown in Table 12. The solid volume fraction (SVF) was 50.13%, the silicate molarity was 1.01 mol/L and the hydroxide molarity was 4.01 mol/L.

TABLE 12

Composition of 1310-kg/m$^3$ slurry.

| Material | Concentration | Concentration Unit | g/600 mL |
|---|---|---|---|
| Type C fly ash | 100 | | 355.34 |
| Glass microspheres | 22.3 | % BWOFA | 79.35 |
| DI Water | 100 | % BWOBF | 157.75 |
| 30% NaOH | 86.0 | % BWOBF | 135.72 |
| Sodium Silicate | 39.7 | % BWOBF | 62.61 |
| Diutan Gum | 0.01 | % BWOFA | 0.03 |
| PEG Antifoam | 0.001 | % BWOBF | 0.05 |

The slurry performance is shown in Table 13.

TABLE 13

Performance of 1310-kg/m$^3$ slurry.

| Measurement | Result | Unit |
|---|---|---|
| Plastic Viscosity (80° F.) | 42 | cP |
| Plastic Viscosity (103° F.) | 49 | cP |
| Yield Value (80° F.) | 6.0 | lbf/100 ft$^2$ |
| Yield Value (103° F.) | 6.3 | lbf/100 ft$^2$ |
| Free Fluid | 0.0 | % |
| 10-sec Gel Strength (80° F.) | 5 | Pa |
| 10-min Gel Strength (80° F.) | 16 | Pa |
| 10-sec Gel Strength (80° F.) | 5 | Pa |

TABLE 13-continued

Performance of 1310-kg/m³ slurry.

| Measurement | Result | Unit |
|---|---|---|
| 10-min Gel Strength (80° F.) | 12 | Pa |
| Thickening Time (103° F.) | 4:03 | hr:min |
| UCA Strength (128° F.) | 325 | lbm/in² (8 hr) |
| " | 504 | lbm/in² (12 hr) |
| " | 775 | lbm/in² (24 hr) |
| API Fluid Loss | 434 | mL/30 min |

Example 2

A 1385-kg/m³ (11.6-lbm/gal) slurry was prepared with the composition shown in Table 14. The solid volume fraction (SVF) was 38.50%, the silicate molarity was 1.00 mol/L and the hydroxide molarity was 3.00 mol/L.

TABLE 14

Composition of 1550-kg/m³ slurry.

| Material | Concentration | Concentration Unit | g/600 mL |
|---|---|---|---|
| Type C fly ash | 100 | | 384.39 |
| Glass microspheres | 10.0 | % BWOFA | 38.44 |
| Tartaric Acid | 0.25 | % BWOFA | 0.96 |
| Phosphoric acid/phosphonate retarder | 0.05 | % BWOBF | 2.56 |
| DI Water | 100 | % BWOBF | 313.43 |
| 30% NaOH | 14.7 | % BWOBF | 46.11 |
| Sodium Silicate | 12.27 | % BWOFA | 47.17 |
| PEG Antifoam | 0.02 | % BWOBF | 0.93 |

The slurry performance is shown in Table 15.

TABLE 15

Performance of 1550-kg/m³ slurry.

| Measurement | Result | Unit |
|---|---|---|
| Plastic Viscosity (80° F.) | 33 | cP |
| Plastic Viscosity (103° F.) | 40 | cP |
| Yield Value (80° F.) | 5.8 | lbf/100 ft² |
| Yield Value (103° F.) | 15.6 | lbf/100 ft² |
| Free Fluid | 0.0 | % |
| 10-sec Gel Strength (80° F.) | 7 | Pa |
| 10-min Gel Strength (80° F.) | 23 | Pa |
| 10-sec Gel Strength (80° F.) | 17 | Pa |
| 10-min Gel Strength (80° F.) | 55 | Pa |
| Thickening Time (103° F.) | 8:17 | hr:min |
| UCA Strength (128° F.) | 325 | lbm/in² (8 hr) |
| " | 504 | lbm/in² (12 hr) |
| " | 775 | lbm/in² (24 hr) |

Example 3

A 1550-kg/m³ (13.6-lbm/gal) slurry was prepared with the composition shown in Table 16. The solid volume fraction (SVF) was 41.41%, the silicate molarity was 1.00 mol/L and the hydroxide molarity was 3.00 mol/L.

TABLE 16

Composition of 1550-kg/m³ slurry.

| Material | Concentration | Concentration Unit | g/600 mL |
|---|---|---|---|
| Type C fly ash | 100 | | 468.62 |
| Clay/silica mixture | 25.0 | % BWOFA | 117.15 |
| Tartaric Acid | 0.5 | % BWOFA | 2.34 |
| DI Water | 100 | % BWOBF | 299.82 |
| 30% NaOH | 14.7 | % BWOBF | 43.93 |
| Sodium Silicate | 9.59 | % BWOFA | 44.94 |
| PEG Antifoam | 0.02 | % BWOBF | 0.98 |

The slurry performance is shown in Table 17.

TABLE 17

Performance of 1550-kg/m³ slurry.

| Measurement | Result | Unit |
|---|---|---|
| Plastic Viscosity (80° F.) | 185 | cP |
| Plastic Viscosity (103° F.) | 175 | cP |
| Yield Value (80° F.) | 36.5 | lbf/100 ft² |
| Yield Value (103° F.) | 16.4 | lbf/100 ft² |
| Free Fluid | 0.0 | % |
| 10-sec Gel Strength (80° F.) | 17 | Pa |
| 10-min Gel Strength (80° F.) | 26 | Pa |
| 10-sec Gel Strength (80° F.) | 16 | Pa |
| 10-min Gel Strength (80° F.) | 24 | Pa |
| Thickening Time (103° F.) | 4:25 | hr:min |
| UCA Strength (120° F.) | 384 | lbm/in² (8 hr) |
| " | 556 | lbm/in² (12 hr) |
| " | 845 | lbm/in² (24 hr) |

Example 4

A 1550-kg/m³ (13.6-lbm/gal) slurry was prepared with the composition shown in Table 18. The solid volume fraction (SVF) was 47.56%, the silicate molarity was 1.11 mol/L and the hydroxide molarity was 4.10 mol/L.

TABLE 18

Composition of 1550-kg/m³ slurry.

| Material | Concentration | Concentration Unit | g/600 mL |
|---|---|---|---|
| Type C fly ash | 100 | | 474.24 |
| Uintaite | 26.72 | % BWOFA | 126.72 |
| Lignosulfonate Retarder | 0.25 | % BWOFA | 1.20 |
| Non-ionic surfactant-ethoxylated alcohol and coconut diethanolamide | 0.002 | % BWOBF | 0.10 |
| DI Water | 100 | % BWOBF | 158.71 |
| 30% NaOH | 90.7 | % BWOBF | 143.97 |
| Sodium Silicate | 0.97 | % BWOBF | 72.36 |
| PEG Antifoam | 0.02 | % BWOBF | 0.10 |

The slurry performance is shown in Table 19.

TABLE 19

Performance of 1550-kg/m³ slurry.

| Measurement | Result | Unit |
|---|---|---|
| Plastic Viscosity (80° F.) | 54 | cP |
| Plastic Viscosity (103° F.) | 69 | cP |
| Yield Value (80° F.) | 16.8 | lbf/100 ft² |
| Yield Value (103° F.) | 25.9 | lbf/100 ft² |
| Free Fluid | 0.0 | % |
| 10-sec Gel Strength (80° F.) | 17 | Pa |
| 10-min Gel Strength (80° F.) | 31 | Pa |
| 10-sec Gel Strength (80° F.) | 22 | Pa |
| 10-min Gel Strength (80° F.) | 44 | Pa |
| Thickening Time (103° F.) | 13:17 | hr:min |
| UCA Strength (120° F.) | 537 | lbm/in² (8 hr) |
| " | 661 | lbm/in² (12 hr) |
| " | 918 | lbm/in² (24 hr) |

Example 5

A 1550-kg/m³ (13.6-lbm/gal) slurry was prepared with the composition shown in Table 20. The solid volume fraction (SVF) was 34.48%, the silicate molarity was 1.00 mol/L and the hydroxide molarity was 3.00 mol/L.

TABLE 20

Composition of 1550-kg/m³ slurry.

| Material | Concentration | Concentration Unit | g/600 mL |
|---|---|---|---|
| Type C fly ash | 100 | | 536.32 |
| Tartaric acid | 0.20 | % BWOFA | 1.07 |
| Citric acid | 0.20 | % BWOFA | 1.07 |
| Glucoheptonate Retarder | 0.60 | % BWOFA | 3.22 |
| DI Water | 100 | % BWOBF | 369.81 |
| 30% NaOH | 4.00 | % BWOBF | 14.72 |
| Sodium Silicate | 9.38 | % BWOFA | 50.28 |
| PEG Antifoam | 0.02 | % BWOBF | 1.30 |

The slurry performance is shown in Table 21.

TABLE 21

Performance of 1550-kg/m³ slurry.

| Measurement | Result | Unit |
|---|---|---|
| Plastic Viscosity (80° F.) | 32 | cP |
| Plastic Viscosity (103° F.) | 40 | cP |
| Yield Value (80° F.) | 11.4 | lbf/100 ft² |
| Yield Value (103° F.) | 16.4 | lbf/100 ft² |
| Free Fluid | 0.0 | % |
| 10-sec Gel Strength (80° F.) | 18 | Pa |
| 10-min Gel Strength (80° F.) | 30 | Pa |
| 10-sec Gel Strength (80° F.) | 17 | Pa |
| 10-min Gel Strength (80° F.) | 25 | Pa |

TABLE 21-continued

Performance of 1550-kg/m³ slurry.

| Measurement | Result | Unit |
|---|---|---|
| Thickening Time (103° F.) | 5:48 | hr:min |
| UCA Strength (120° F.) | 597 | lbm/in² (8 hr) |
| " | 771 | lbm/in² (12 hr) |
| " | 998 | lbm/in² (24 hr) |

Example 6

A 1550-kg/m³ (13.6-lbm/gal) slurry was prepared with the composition shown in Table 22. The solid volume fraction (SVF) was 40.58%, the silicate molarity was 1.00 mol/L and the hydroxide molarity was 4.00 mol/L.

TABLE 22

Composition of 1550-kg/m³ slurry.

| Material | Concentration | Concentration Unit | g/600 mL |
|---|---|---|---|
| TypeC fly ash | 100 | | 453.33 |
| Powdered coal | 25.0 | % BWOFA | 113.33 |
| Non-ionic surfactant-ethoxylated alcohol and coconut diethanolamide | 0.01 | % BVOBF | 0.52 |
| DI Water | 100 | % BWOBF | 271.91 |
| 30% NaOH | 33.9 | % BWOBF | 92.09 |
| Sodium Silicate | 10.05 | % BWOFA | 45.58 |
| PEG Antifoam | 0.02 | % BWOBF | 1.02 |

The slurry performance is shown in Table 23.

TABLE 23

Performance of 1550-kg/m³ slurry.

| Measurement | Result | Unit |
|---|---|---|
| Plastic Viscosity (80° F.) | 65 | cP |
| Plastic Viscosity (103° F.) | 98 | cP |
| Yield Value (80° F.) | 8.0 | lbf/100 ft² |
| Yield Value (103° F.) | 18.6 | lbf/100 ft² |
| Free Fluid | 0.0 | % |
| 10-sec Gel Strength (80° F.) | 7 | Pa |
| 10-min Gel Strength (80° F.) | 20 | Pa |
| 10-sec Gel Strength (80° F.) | 17 | Pa |
| 10-min Gel Strength (80° F.) | 45 | Pa |
| Thickening Time (103° F.) | 4:58 | hr:min |
| UCA Strength (120° F.) | 361 | lbm/in² (8 hr) |
| " | 436 | lbm/in² (12 hr) |
| " | 584 | lbm/in² (24 hr) |

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. A method, comprising:
    preparing a geopolymer precursor comprising an aluminosilicate source, a metal silicate, an alkali or alkaline earth activator, a carrier fluid including water, slurry density modifier particles, and a viscosifier, the viscosifier including diutan gum having a molecular weight greater than 1,000,000 g/mol, the viscosifier having a viscosifier concentration of between 0.14 g/L and 1.4 g/L, wherein the geopolymer precursor is pumpable and has a solids volume fraction of 35% to 75%;
    placing the geopolymer precursor in a subterranean well; and
    hardening the geopolymer precursor into a solid geopolymer.

2. The method of claim 1, wherein the slurry density modifier particles comprise hollow glass or ceramic microspheres, plastic particles, uintaite, vitrified shale, petroleum coke or coal, hematite, barite, ilmenite, silica, manganese tetroxide, or combinations thereof.

3. The method of claim 1, wherein the slurry density modifier particles have a particle size of 0.3 μm to 3350 μm.

4. The method of claim 1, wherein the geopolymer precursor further comprises a fluid-loss control agent comprising an alkali-swellable latex present in the geopolymer precursor at a latex concentration of 0.02 L/L to 0.3 L/L.

5. The method of claim 1, wherein the metal silicate comprises sodium metasilicate.

6. The method of claim 5, wherein the sodium metasilicate is present in the geopolymer precursor at a metal silicate concentration of 0.01 kg/L to 0.2 kg/L.

7. The method of claim 1, wherein the geopolymer precursor further comprises calcium sulfate hemihydrate.

8. The method of claim 1, wherein the geopolymer precursor further comprises an additive including at least one of glucoheptonic acid, a soluble salt of glucoheptonic acid, tartaric acid, a soluble salt of tartaric acid, citric acid, a soluble salt of citric acid, glycolic acid, a soluble salt of glycolic acid, lactic acid, a soluble salt of lactic acid, formic acid, a soluble salt of formic acid, acetic acid, a soluble salt of acetic acid, propionic acid, a soluble salt of propionic acid, oxalic acid, a soluble salt of oxalic acid, malonic acid, a soluble salt of malonic acid, succinic acid, a soluble salt of succinic acid, adipic acid, a soluble salt of adipic acid, malic acid, a soluble salt of malic acid, nicotinic acid, a soluble salt of nicotinic acid, benzoic acid, a soluble salt of benzoic acid, ethylenediamine tetraacetic acid, a soluble salt of ethylenediamine tetraacetic acid, phosphoric acid, or a soluble salt of phosphoric acid.

9. The method of claim 1, wherein the aluminosilicate source comprises granulated blast furnace slag, a fly ash, volcanic ash, calcined clay, aluminum-containing silica fume, natural aluminosilicate, synthetic aluminosilicate glass powder, zeolite, scoria, allophone, bentonite, red mud, pumice, or a combination thereof.

10. The method of claim 1, wherein the alkali or alkaline earth activator comprises alkali metal hydroxide, alkaline earth metal hydroxide, alkali salts, or combinations thereof.

11. A geopolymer precursor, comprising:
    an aluminosilicate source, a metal silicate, an alkali or alkaline earth activator, a carrier fluid including water, slurry density modifier particles, and a viscosifier, the viscosifier including diutan gum having a molecular weight of at least 1,000,000 g/mol, the viscosifier having a viscosifier concentration of between 0.14 g/L and 1.4 g/L, wherein the geopolymer precursor is pumpable and has a solids volume fraction of 35% to 75%.

12. The geopolymer precursor of claim 11, wherein the slurry density modifier particles comprise hollow glass or ceramic microspheres, plastic particles, uintaite, vitrified shale, petroleum coke or coal, hematite, barite, ilmenite, silica, manganese tetroxide, or combinations thereof.

13. The geopolymer precursor of claim 11, wherein the slurry density modifier particles have a particle size of 0.3 μm to 3350 μm.

14. The geopolymer precursor of claim 11, further comprising an additive including at least one of glucoheptonic acid, a soluble salt of glucoheptonic acid, tartaric acid, a soluble salt of tartaric acid, citric acid, a soluble salt of citric acid, glycolic acid, a soluble salt of glycolic acid, lactic acid, a soluble salt of lactic acid, formic acid, a soluble salt of formic acid, acetic acid, a soluble salt of acetic acid, propionic acid, a soluble salt of propionic acid, oxalic acid, a soluble salt of oxalic acid, malonic acid, a soluble salt of malonic acid, succinic acid, a soluble salt of succinic acid, adipic acid, a soluble salt of adipic acid, malic acid, a soluble salt of malic acid, nicotinic acid, a soluble salt of nicotinic acid, benzoic acid, a soluble salt of benzoic acid, ethylenediamine tetraacetic acid, a soluble salt of ethylenediamine tetraacetic acid, phosphoric acid, or a soluble salt of phosphoric acid.

15. A method, comprising:
    obtaining a pumpable geopolymer precursor comprising an aluminosilicate source, a metal silicate, an alkali or alkaline earth activator, a carrier fluid including water, slurry density modifier particles, and a viscosifier, the viscosifier including diutan gum having a molecular weight of at least 1,000,000 g/mol, the viscosifier having a viscosifier concentration of between 0.14 g/L and 1.4 g/L, wherein the pumpable geopolymer precursor has a solids volume fraction of 35% to 75%;
    placing the pumpable geopolymer precursor in a subterranean well, and hardening the pumpable geopolymer precursor into a solid geopolymer.

16. The method of claim 15, wherein the slurry density modifier particles comprise hollow glass or ceramic microspheres, plastic particles, uintaite, vitrified shale, petroleum coke or coal, hematite, barite, ilmenite, silica, manganese tetroxide, or combinations thereof.

17. The method of claim 16, wherein the slurry density modifier particles have a particle size of 0.3 μm to 3350 μm.

18. The method of claim 15, wherein the pumpable geopolymer precursor further comprises an additive including at least one of glucoheptonic acid, a soluble salt of glucoheptonic acid, tartaric acid, a soluble salt of tartaric acid, citric acid, a soluble salt of citric acid, glycolic acid, a soluble salt of glycolic acid, lactic acid, a soluble salt of lactic acid, formic acid, a soluble salt of formic acid, acetic acid, a soluble salt of acetic acid, propionic acid, a soluble salt of propionic acid, oxalic acid, a soluble salt of oxalic acid, malonic acid, a soluble salt of malonic acid, succinic acid, a soluble salt of succinic acid, adipic acid, a soluble salt of adipic acid, malic acid, a soluble salt of malic acid, nicotinic acid, a soluble salt of nicotinic acid, benzoic acid, a soluble salt of benzoic acid, ethylenediamine tetraacetic acid, a soluble salt of ethylenediamine tetraacetic acid, phosphoric acid, or a soluble salt of phosphoric acid.

19. The method of claim 15, wherein the metal silicate comprises sodium metasilicate.

20. The method of claim 15, wherein the pumpable geopolymer precursor further comprises calcium sulfate hemihydrate.

* * * * *